UNITED STATES PATENT OFFICE.

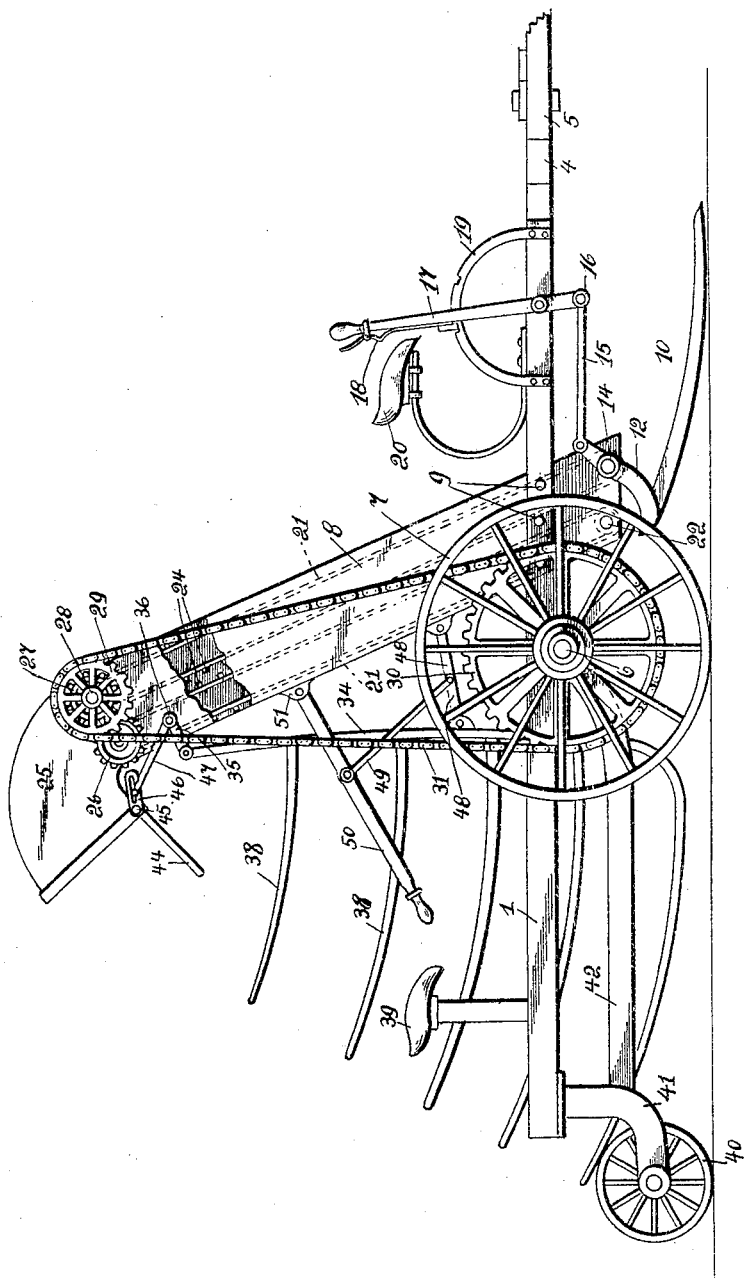

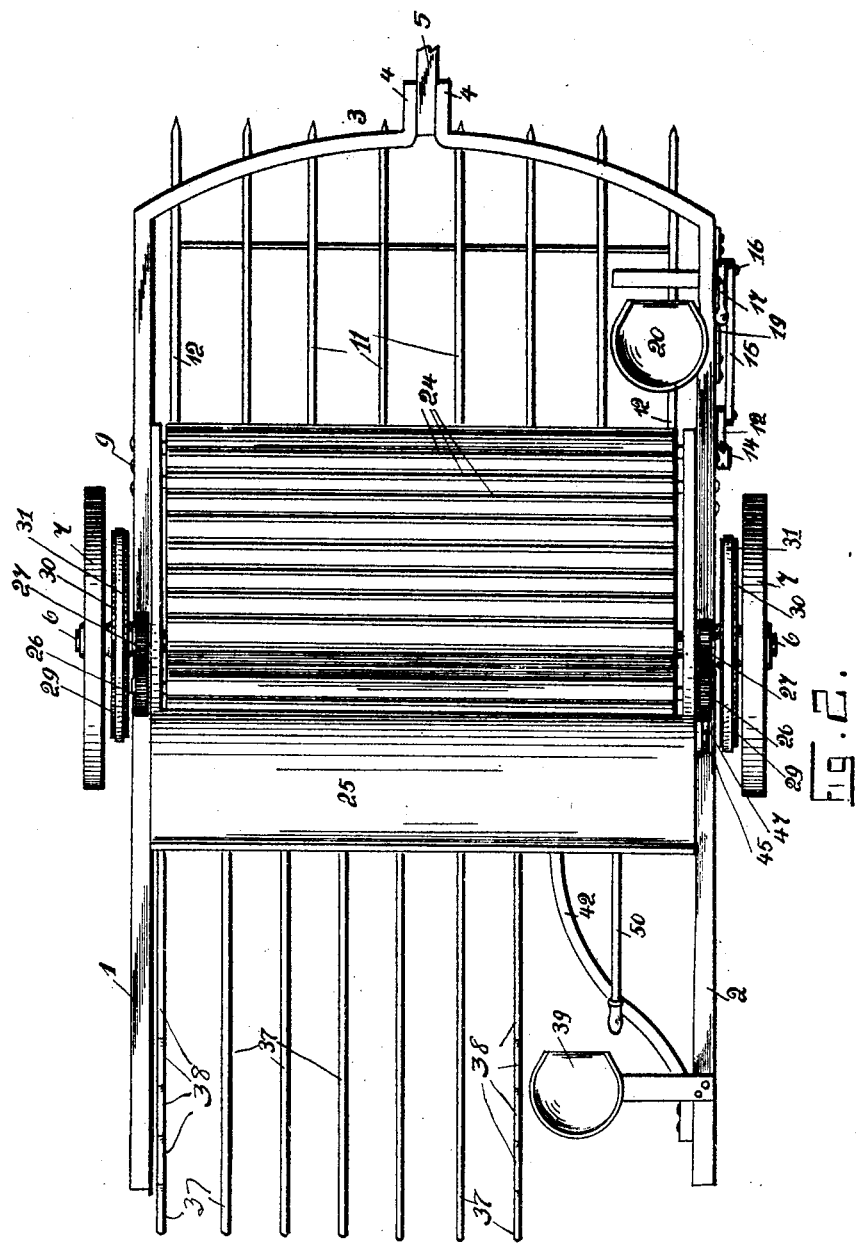

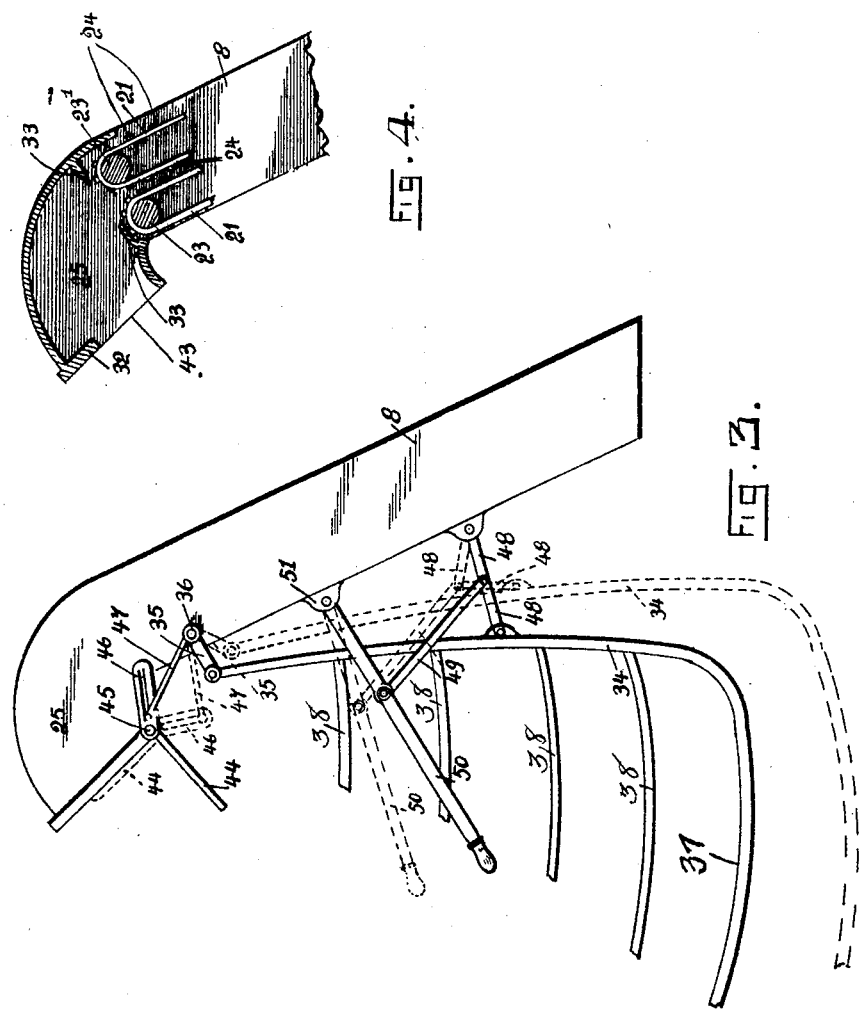

EPHRAIM J. FOSTER AND JAMES M. FOSTER, OF STEUBENVILLE, OHIO.

HAY RAKING AND STACKING MACHINE.

No. 805,847.　　　　Specification of Letters Patent.　　　　Patented Nov. 28, 1905.

Application filed January 19, 1905. Serial No. 241,776.

*To all whom it may concern:*

Be it known that we, EPHRAIM J. FOSTER and JAMES M. FOSTER, citizens of the United States of America, residing at Steubenville, in the county of Jefferson and State of Ohio, have invented certain new and useful Improvements in Hay Raking and Stacking Machines, of which the following is a specification, reference being had therein to the accompanying drawings.

This invention relates to certain new and useful improvements in hay raking and stacking machines, and has for its object to provide a machine of this type that will rake hay, convey the same to a suitable carrying-frame from where the hay can be deposited upon the ground after a suitable quantity has been deposited on the carrying-frame. To this end we have constructed a machine which can be readily operated in a field for stacking or cocking hay, and in connection with the machine we have provided novel means for conveying the hay from the rake to the carrying-frame and then depositing the same upon the ground without causing a cessation of the machine.

With the above and other objects in view the invention finally consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 1 is a side elevation of our improved machine. Fig. 2 is a top plan view of the same. Fig. 3 is a side elevation view of a conveyer-casing, carrying-frame, and the mechanism carried by said casing and said frame; and Fig. 4 is a vertical sectional view of a discharge-chute carried by the conveyer-casing.

To put our invention into practice, we have constructed the machine comprising side rails 1 and 2, and the forward ends of these rails are bent inwardly, forming the front rail 3 of the machine. Between the outwardly-bent ends 4 of the front rail may be secured a tongue 5, by which the machine can be pulled or guided by a team of horses hitched to the same. The side rails 1 and 2 are provided with suitable bearings, in which is journaled an axle 6, and upon the outer ends of said axle are mounted wheels 7 7.

The reference-numeral 8 designates a conveyer-casing which is secured to the side rails 1 and 2 by suitable fastening means 9, such as bolts or rivets. The conveyer-casing 8 is inclined at an angle approximately sixty-five degrees in respect to the side rails 1 and 2 of the machine, this inclination of the conveyer-casing assisting in the transmission of hay from one end to the other, as will be presently described. To the sides of the conveyer-casing, at the lower end thereof, is pivotally mounted a raking-frame 10, which comprises a plurality of teeth or tines 11 and side frames 12 12, which are pivoted, as indicated at 14, to the conveyer-casing 8. To the upper end of one of the frames 12 is pivotally connected a link 15, the opposite end of which is connected, as indicated at 16, to a lever 17, pivotally mounted upon the side rail 2. This lever is provided with a suitable locking-lever 18, which is adapted to engage in a segment-shaped toothed rack 19, carried by the side rail 2.

The reference-numeral 20 designates a suitable seat mounted upon the side rail 2 in close proximity to the lever 17, whereby an operator sitting upon the seat 20 can easily manipulate the lever 17 to raise or lower the rake 10.

The conveyer-casing 8 is provided with the endless belts or aprons 21 21, which travel over pulleys 22 22, mounted at the bottom of the casing 8, and over pulleys or rollers 23 23', mounted in the upper end of the straight portion of the casing 8. The aprons 21 are provided with a plurality of strips 24, and we have provided novel means for moving said aprons, whereby they will convey hay from the lower end of the casing to the discharge-chute 25 thereof. The outer end of the roller or pulley 23, which protrudes outside of the casing 8, is provided with a toothed wheel 26, which is adapted to mesh with a toothed wheel 27, mounted upon a shaft 28, which carries the roller or pulley 23'. The end of the roller or pulley 23' is provided with a toothed or sprocket wheel 29. The axle 6 is provided with a sprocket-wheel 30, which is preferably constructed of a greater diameter than the wheel 29, and over the sprocket-wheel 30 and the wheel 29 is mounted a sprocket-chain 31.

The discharge-chute 25 is formed by the curved upper end of the casing 8 and is partially closed, as indicated at 32. The discharge-chute is provided with inwardly-extending flanges 33 to protect the upper edges of the aprons 21 21 and also to form a support for the hay carried into said discharge-chute by the endless aprons 21 21.

The reference-numeral 34 designates a carrying-frame which is pivotally connected to a bell-crank lever 35, said lever being pivotally mounted upon the side of the conveyer-casing 8, as indicated at 36.

The carrying-frame 34 embodies hanger-rods, side arms 38, and rearwardly-extending arms 37, the side arms increasing in length from the uppermost to the lowermost arm on each side. These side arms may be the extremities of U-shaped bars attached to the hanger-rods of the frame. These arms form a cage in which hay is deposited, and we preferably construct this cage whereby it will occupy approximately the rear end of our improved machine; but in the accompanying drawings we have illustrated the same as being formed of a less width than the machine, whereby we can provide the side rail 2 of the machine with a suitable seat 39, upon which an operator may sit to control the passage of hay into the cage or carrying-frame and also the disposition of the hay when the frame has become filled. The rear end of the side rail 2 is also provided with a small pony-wheel 40, and the hanger 41 of said wheel is braced by a curved bar 42, which forms a foot-rest for the operator sitting upon the seat 39.

To control the amount of hay to be deposited within the cage or carrying frame 34, we have provided the opening 43 of the discharge-chute 25 with a pivoted gate 44, the pivot-pin 45 of which is provided with a slotted lever 46, and in the slot of said lever engages the end of the arm 47 of the bell-crank lever 35. To deposit the hay on the ground, it is necessary that the carrying-frame or cage be lowered, and to accomplish this we have connected the cage or carrying-frame 34 to the conveyer-casing 8 by toggle-levers 48 48, and connected to the pivoted connection of said toggle-levers is a rod 49, which is pivoted to a lever 50, pivotally mounted in bosses 51, carried by the rear face of the conveyer-casing 8.

Operation: We will assume that the rake 10 is in the position illustrated in Fig. 1 of the drawings, and that the machine is being pulled over ground strewn with hay. As the machine is drawn forward the hay is gathered by the rake 10 and forced rearwardly upon the rake-frame until it engages the aprons or belts 21, and as said aprons are being moved by the sprocket-wheels 29 and 30 and chain 31 the hay will be carried up between said belts by the strips 24 of each belt and deposited within the discharge-chute 25. The manner of gearing the aprons, as illustrated in the accompanying drawings, permits of the confronting surfaces of the aprons traveling in the same direction, whereby each apron will assist the hay in mounting the conveyer-casing. When the hay enters the discharge-chute 25, it is ejected through the opening 43 to the carrying-frame or cage. This operation continues until the operator of the machine discovers that the cage or carrying-frame has become filled and that it is necessary to deposit the hay upon the ground. To accomplish this, the lever 50 is manipulated by the operator sitting upon the rear seat 39 of the machine, and upon raising the lever to the dotted-line position (illustrated in Fig. 3 of the drawings) the toggle-levers 48 are broken, which permits of the cage or carrying-frame receding to the position illustrated in dotted lines of Fig. 3, and it will be observed that through the medium of the pivoted bell-crank lever 36 and slotted lever 46 the gate 44 will be closed and the hay which is being carried upward within the conveyer-casing 8 will be retained and permitted to accumulate in said discharge-chute until the carrying-frame or cage has deposited its load. When the carrying-frame has been lowered, the hay contained within the same is permitted to engage or contact with the ground, which, in a hay-field, is generally covered with stubble, and the frictional engagement of the load of hay with the stubble causes the same to adhere to the ground and the forward movement of the machine withdraws the carrying-frame from beneath the load of hay. Upon the shock or hay-cock being deposited upon the field the lever 50 is again lowered, which elevates the cage and opens the gate 44, permitting the hay contained within the discharge-chute to be deposited within the cage or carrying-frame.

When the machine is being moved, as from one field to another, the rake-frame 10 is elevated by the lever 17, or during the operation of the machine in a field should the rake-frame 10 encounter a stone or stump the frame can be elevated to prevent the teeth or tines 11 from becoming broken or injured by contacting with such object. In connection with our improved machine we may employ means, such as ratchet arrangement, in order that the elevators or conveyers may continue in operation, while the machine is being turned completely around or at a corner.

While we have herein described the device as particularly adapted for the raking and cocking of hay, yet we do not wish to confine ourselves to this specific use, as it will readily be apparent that the device could be employed for the raking and cocking of grain where the latter is to be gathered in loose form.

What we claim, and desire to secure by Letters Patent, is—

1. In a machine of the type described, a frame, an elevator-casing carried by the frame and extending below the same, a rake pivotally suspended from said elevator-casing, means attached to the frame and connected to the rake for adjusting the position of the latter, conveyer-belts within said casing and disposed to receive the material accumulated on the rake, a discharge-chute at the upper end of the conveyer-casing to receive the material from the conveyer-belts, tiltable carrying-arms pivotally suspended from the elevator-casing and disposed to receive the material from the discharge-chute, a gate pivotally connected to the discharge-chute, and connections between said gate and the carrying-arms whereby when the carrying-arms are operated the gate is moved into position to temporarily restrain the material within the discharge-chute.

2. In a device of the type described, the combination of a frame, suitably supported to travel, a conveyer-casing carried by said frame, a rake pivotally suspended from the conveyer-casing, means for regulating the position of said rake, conveyer-belts traveling within the casing and disposed to receive the material from said rake, a discharge-chute arranged at the upper end of the conveyer-casing to receive the material from the conveyer-belts, a carrying-frame pivotally suspended from the conveyer-casing, and comprising a series of substantially L-shaped arms adapted to receive the material from the discharge-chute, toggle-levers connecting the said carrying-frame to the discharge-chute, a lever connected to the elevator-casing and attached by a link to said toggle-levers for actuating the carrying-frame, a gate pivotally attached to the discharge-chute, and connections between the carrying-frame and the gate whereby the latter will operate to temporarily restrain the material within the discharge-chute when the carrying-frame is lowered.

In testimony whereof we affix our signatures in the presence of two witnesses.

EPHRAIM J. FOSTER.
JAMES M. FOSTER.

Witnesses:
B. H. MAXWELL,
JAMES F. SARRATT.